US012689545B2

(12) United States Patent
Le Bidan

(10) Patent No.: US 12,689,545 B2
(45) Date of Patent: Jul. 21, 2026

(54) RECEIVER, TRANSCEIVER SYSTEM AND ASSOCIATED RECEIVING METHOD

(71) Applicant: INSTITUT MINES TELECOM, Palaiseau (FR)

(72) Inventor: Raphaël Le Bidan, Plouzané (FR)

(73) Assignee: INSTITUT MINES TELECOM, Palaiseau (FR)

( * ) Notice: Subject to any disclaimer, the term of this patent is extended or adjusted under 35 U.S.C. 154(b) by 37 days.

(21) Appl. No.: 18/719,573

(22) PCT Filed: Dec. 13, 2022

(86) PCT No.: PCT/EP2022/085484
§ 371 (c)(1),
(2) Date: Jun. 13, 2024

(87) PCT Pub. No.: WO2023/110792
PCT Pub. Date: Jun. 22, 2023

(65) Prior Publication Data
US 2025/0055733 A1     Feb. 13, 2025

(30) Foreign Application Priority Data
Dec. 17, 2021    (FR) ...................................... 2113831

(51) Int. Cl.
*H04L 25/03*          (2006.01)
(52) U.S. Cl.
CPC .. *H04L 25/03038* (2013.01); *H04L 25/03057* (2013.01); *H04L 2025/03636* (2013.01)

(58) Field of Classification Search
CPC ......... H04L 25/03038; H04L 25/03057; H05L 2025/03636
See application file for complete search history.

(56) References Cited

U.S. PATENT DOCUMENTS

| | | | |
|---|---|---|---|
| 6,680,985 B1 * | 1/2004 | Strodtbeck | .......... H04L 27/3809 375/232 |
| 2004/0190649 A1 * | 9/2004 | Endres | ................. H03G 3/3052 375/326 |

(Continued)

OTHER PUBLICATIONS

Lian, et al., "M-PAM Joint Optimal Waveform Design for Multiuser VLC Systems Over ISI Channels", Journal of Lightwave Technology, vol. 36, Issue 16, pp. 3472-3480, (2018).

(Continued)

*Primary Examiner* — Janice N Tieu
(74) *Attorney, Agent, or Firm* — BakerHostetler

(57) ABSTRACT

The receiver includes a sampler designed to provide one or more samples ($y_n$) per received symbol, the symbols belonging to a predefined alphabet; an equalizer designed to compute, for each received symbol, an estimate ($z_n$) of this symbol based on a linear combination ($y'_n$) of the samples ($y_n$) for this symbol; and a decision module designed to determine the symbol of the alphabet closest to the estimate ($z_n$) as detected symbol. The alphabet exhibits a decentering such that the transmitted symbols have a non-zero predefined expectation, and the equalizer is designed to add a non-zero scalar component ($\theta$) to the linear combination ($y'_n$) in order to compensate at least partially for the decentering.

15 Claims, 10 Drawing Sheets

(56) References Cited

U.S. PATENT DOCUMENTS

| | | | |
|---|---|---|---|
| 2005/0019042 A1 | 1/2005 | Kaneda et al. | |
| 2005/0232348 A1* | 10/2005 | Chang .............. | H04L 25/03057 |
| | | | 375/233 |
| 2021/0184711 A1* | 6/2021 | Wang ....................... | H04B 1/16 |
| 2024/0372753 A1* | 11/2024 | Vad-Miller ........... | H04L 25/062 |

OTHER PUBLICATIONS

Cioffi, et al., "MMSE Decision-Feedback Equalizers and Coding—Part I: Equalization Results", IEEE Transactions on Communications, vol. 43, No. 10, Oct. 1995.

* cited by examiner

800

E80    $\mathbf{p}^H = (1,0,0,\ldots,0)\;;$
       $\mathbf{q}^H = (0,0,0,\ldots,0)\;;\; \Theta = 0$ E82    Tx/Rx E84    $e_n = z_n - s_{n-\Delta}$ E86    $p_{n+1}^H = p_n^H - \mu_1 e_n y_n^H$
       $q_{n+1}^H = q_n^H + \mu_1 e_n \hat{s}_n^H$
       $\Theta_{n+1} = \Theta_n - \mu_2 e_n$

B1

B2

E88    ?     $e_n > e_1$ $e_n < e_1$

E89    $e_n = z_n - \hat{s}_{n-\Delta}$

910

RECEIVER, TRANSCEIVER SYSTEM AND ASSOCIATED RECEIVING METHOD

CROSS-REFERENCE TO RELATED APPLICATIONS

This application is a National Stage of International patent application PCT/EP2022/085484, filed on Dec. 13, 2022, which claims priority to foreign French patent application No. FR 2113831, filed on Dec. 17, 2021, the disclosures of which are incorporated by reference in their entireties.

FIELD OF THE INVENTION

The present invention relates to the field of digital data transmissions, and more particularly to equalization for digital communications.

It relates more particularly to a receiver, to a transmission/reception system comprising said receiver, and to an associated reception method.

BACKGROUND

Conventionally, a digital receiver on a transmission chain comprises an equalizer for reducing errors in the detection of symbols transmitted by a transmitter, in the presence of noise and inter-symbol interference (ISI).

Inter-symbol interference may be caused by:
a limited bandwidth of certain components of the transmission chain, for example photodetector of the receiver, attenuating or phase-shifting some frequencies of the modulated signal more greatly than others;
superposition, at the receiver, of multiple echoes of the modulated signal that are received with their own distinct attenuations, delays and phase shifts, typically in the case of a multipath transmission channel.

As is known, the receiver comprises:
a sampler designed to sample a received signal that has propagated in a propagation channel, successive symbols being encoded in this received signal, in order to provide one or more samples per received symbol, the symbols belonging to a predefined alphabet;
an equalizer designed to compute, for each received symbol, an estimate of this symbol based on a linear combination of the samples for this symbol; and
a decision module designed to determine the symbol of the alphabet closest to the estimate as detected symbol.

The article entitled "MMSE Decision-Feedback Equalizers and Coding—Part I: Equalization Results" by John M. Cioffi and M. Vedat Eyuboglu, published in *IEEE Transactions on Communications*, Vol. 43, No. 10, in October 1995, describes one example of a minimum mean-squared-error decision-feedback equalizer. This type of filter is commonly referred to as an MMSE-DFE.

The inventors have observed that a receiver using this type of equalizer may exhibit reduced reception performance (for example high bit error rate).

It may thus be desirable to provide a receiver that improves reception performance.

SUMMARY OF THE INVENTION

What is therefore proposed is a digital data receiver comprising:
a sampler designed to sample a received signal that has propagated in a propagation channel, successive symbols being encoded in this received signal, in order to provide one or more samples per received symbol, the symbols belonging to a predefined alphabet;
an equalizer designed to compute, for each received symbol, an estimate of this symbol based on a linear combination of the samples for this symbol; and
a decision module designed to determine the symbol of the alphabet closest to the estimate as detected symbol;
characterized in that the alphabet exhibits a decentering such that the transmitted symbols have a non-zero predefined expectation, and in that the equalizer is designed to add a non-zero scalar component to the linear combination in order to compensate at least partially for the decentering.

Indeed, the non-centering of the modulation alphabet induces a bias in the estimate. In particular, with a non-centered alphabet, the MMSE-DFE equalizer from the prior art recalled above is not optimum in that it does not make it possible to minimize the mean-squared-error criterion.

Adding the non-zero scalar component before making the decision makes it possible to compensate at least partially for the induced bias, and thus to obtain more efficient symbol detection, in particular by achieving a reduced bit error rate.

This means that the decision module following the equalizer may consist of decision thresholds or regions the value or form of which are independent of the equalizer, and dependent solely on the modulation alphabet. The practical implementation thereof is therefore simplified as a result, for example compared to the decision module of the receiver from the prior art described above, where the decision thresholds have to be adapted to the value of the coefficients of the equalizer.

The invention may furthermore comprise one or more of the following optional features, in any technically feasible combination.

Optionally, the equalizer is designed to compute the scalar component based on coefficients of the linear combination of the samples and the predefined expectation.

Also optionally, the equalizer is designed to compute the scalar component based on a channel matrix representative of the propagation channel.

Also optionally, said channel matrix is a block Toeplitz matrix.

Also optionally, the equalizer is designed to compute said scalar component so as to minimize a mean squared error between the transmitted symbols and the estimates.

Also optionally, the equalizer comprises a feedforward filter, preferably a finite impulse response filter, and the equalizer is designed to apply this feedforward filter to the samples in order to provide said linear combination.

Also optionally, the equalizer is designed to compute, for each received symbol, the estimate of this symbol independently of previously detected symbols.

Also optionally, the equalizer is designed to compute, for each received symbol, the estimate of this symbol based on a difference between the linear combination of the samples for this symbol and a linear combination of previously detected symbols, the scalar component being added to this difference.

Also optionally, the equalizer furthermore comprises what is referred to as a backward filter, preferably a finite impulse response filter, and the equalizer is designed to apply this backward filter to the previously detected symbols so as to provide said linear combination of previously detected symbols.

Also optionally, the equalizer is designed to compute the scalar component based on the feedforward filter.

Also optionally, the equalizer is designed to compute the scalar component based on the backward filter as well.

Also optionally, the equalizer is designed to iteratively update the scalar component on the basis of symbols previously determined by the decision module.

What is also proposed is a digital communication system, characterized in that it comprises a transmitter designed to transmit symbols selected from an alphabet with a non-zero expectation, and a receiver according to the invention.

What is also proposed is a method for receiving digital data, comprising:

for each of multiple successive symbols encoded in a received signal that has propagated in a propagation channel, the symbols belonging to a predefined alphabet, receiving multiple samples;

carrying out a linear equalization by computing, for each received symbol, an estimate of this symbol based on a linear combination of the samples for this symbol; and determining the symbol of the alphabet closest to the estimate as detected symbol;

characterized in that the alphabet exhibits a decentering such that the transmitted symbols have a non-zero predefined expectation, and in that the linear equalization comprises adding a non-zero scalar component to the linear combination in order to compensate at least partially for the decentering.

What is also proposed is a computer program able to be downloaded from a communication network and/or recorded on a computer-readable medium, characterized in that it comprises instructions for executing the steps of a method according to the invention when said program is executed on a computer.

BRIEF DESCRIPTION OF THE DRAWINGS

The invention will be better understood with the aid of the following description, which is given solely by way of example and with reference to the appended drawings, in which.

DETAILED DESCRIPTION

Hereinafter, vectors will be indicated in bold so as to distinguish them from scalars. The exponent$^H$ associated with a matrix will hereinafter denote the conjugate transpose of this matrix.

Figure 1:
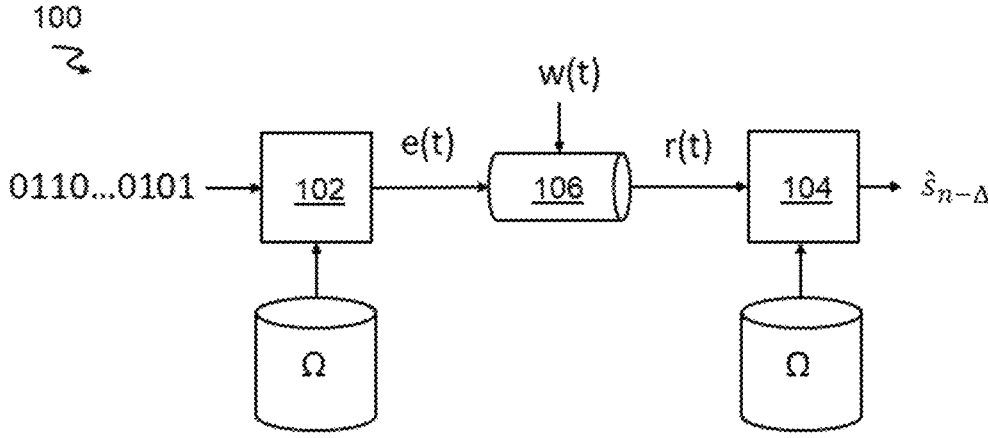
FIG. 1 schematically illustrates a communication system implementing the present invention.

One example of a digital communication system 100 in which the invention is implemented will now be described with reference to FIG. 1.

The digital communication system 100 comprises a transmitter 102, a receiver 104 and a propagation channel 106 connecting the transmitter 102 to the receiver 104.

More specifically, the transmitter 102 is designed to transmit a signal e(t) carrying a digital message. By definition, a digital message is a sequence of binary elements, commonly referred to as bits.

The transmitter 102 is designed to successively encode, in the signal e(t), symbols $s_n$ respectively representing blocks or words of p successive bits. Each symbol $s_n$ corresponds to one or more modulations of a carrier signal at a carrier frequency, such that the modulated carrier signal forms the signal e(t). Each symbol $s_n$ belongs to an alphabet $\Omega$ with K elements $\{S_0, S_1, \ldots, S_{K-1}\}$ respectively associated with the various possible combinations of bits in a word. The transmitter 102 is designed to transmit the symbols regularly with a symbol period Ts.

In the context of the present invention, this alphabet $\Omega$ is non-centered, that is to say that the transmitted symbols $s_n$ have a non-zero expectation, that is to say $\mathbb{E}[s_n] \neq 0$, in particular when the transmitted data lead to a substantially equiprobable selection of the elements of the alphabet $\Omega$.

Modulations having a non-centered alphabet include intensity modulations, such as on-off keying (OOK) or else the K-ary generalizations thereof (K being the number of possible intensity levels). Any other modulation may also be used, provided that the alphabet that is used is non-centered.

In general, it will be assumed that the transmitted symbols are decorrelated from one another, that is to say that the value of a transmitted symbol does not depend on the value of the previously transmitted symbols, and that the transmitted symbols $s_n$ have a non-zero variance:

$$\sigma_s^2$$

$$= \mathbb{E}[|s_n|^2] - \mathbb{E}^2[s_n].$$

For example, in the case of an optical communication system implementing optical on-off keying (OOK), the transmitter 102 may be an amplitude-modulated laser source configured to transmit a laser pulse of amplitude A upon each symbol associated with the bit "1", but no pulse (that is to say substantially zero amplitude) upon each symbol associated with the bit "0". The reverse association could also be used. In this case, the transmitted symbols $s_n$ take their values equiprobably from the binary alphabet $\{0, A\}$, and so their expectation $\mathbb{E}[s_n]$ is equal to A/2 and their variance $$\sigma_s^2$$

is equal to $A^2/4$.

In general, the propagation channel 106 is a physical medium designed to transmit the signal e(t) transmitted by the transmitter 102, for example in the form of electromagnetic (that is to say optical or radiofrequency) waves, such that it is able to be received by the receiver 104. For example, the propagation channel 106 is an optical fiber, a coaxial electrical line, air or water or any other natural medium able to transmit for example an optical or radiofrequency signal.

The propagation channel 106 is linear in the sense that the effects or deformations that it induces on the signal are linear. To this end, the transmitter 102 is for example configured to transmit at a power lower than a non-linear distortion threshold of the propagation channel 106, for example a non-linear dispersion threshold.

For example, in the case of an optical communication in which the propagation channel 106 is an optical fiber, the transmitted optical power is adapted according to the optical fiber that is used in order to avoid the non-linear effects of the fiber.

In addition, the propagation channel 106 is of a dispersive nature, that is to say liable to generate inter-symbol interference. For example, this is the case for a chromatic-dispersion optical fiber that induces widening of optical pulses during propagation or for a multipath radio or optical transmission channel in which multiple copies of one and the same symbol are detected by the receiver 104 with different delays.

Moreover, the propagation channel 106 may be marred by a noise w(t), for example with zero mathematical expectation and independent of the transmitted symbols $s_n$. For example, the noise w(t) is a centered Gaussian additive noise with a variance $\sigma_w^2$.

The receiver 104 is designed to receive an analog signal r(t) corresponding to the transmitted signal e(t) after propagation through the propagation channel 106.

Conventionally, the receiver 104 is for example configured to receive the received signal r(t) on the carrier frequency of the signal from the transmitter 102 and to transpose this signal into baseband (that is to say around a zero frequency) and to filter it, for example, by applying a low-pass filter. The signal after transposition and filtering is still denoted r(t).

Knowing the alphabet $\Omega$, the receiver 104 is also designed to detect, in this received signal r(t), the symbols $s_n$ that were initially transmitted, in particular in the presence of noise and inter-symbol interference in the received signal r(t). The receiver 104 is thus designed to provide a detected symbol $\hat{s}_n$ for each transmitted symbol $s_n$.

Figure 2:
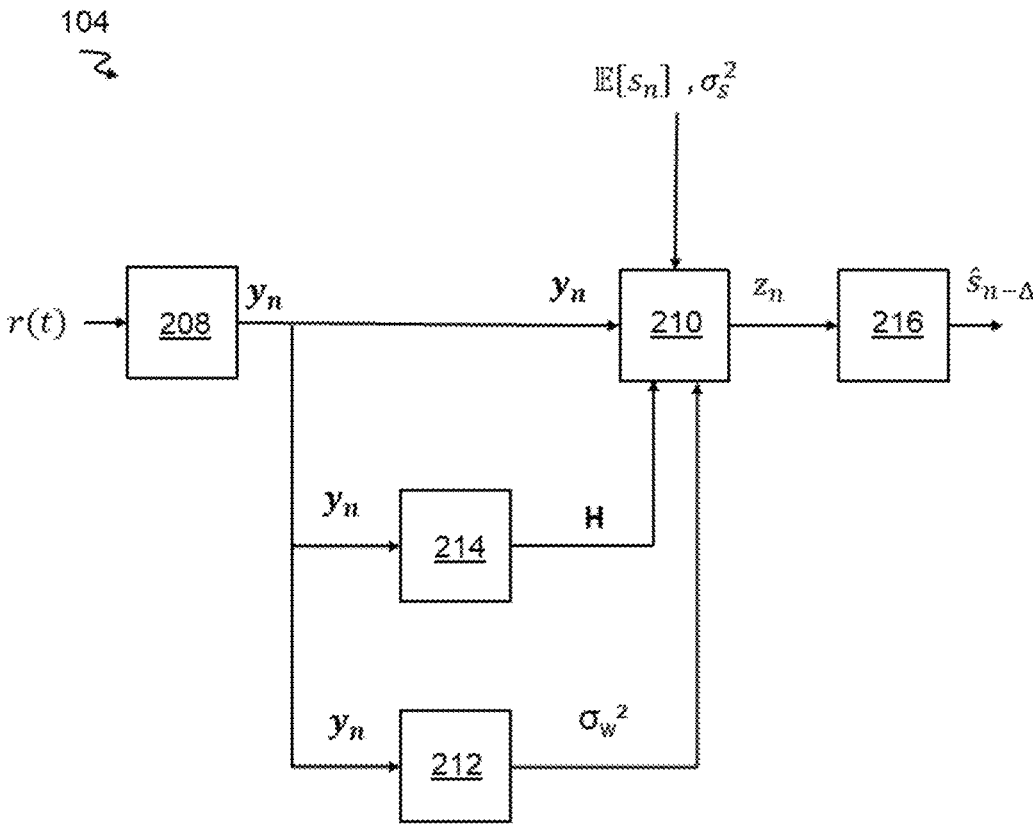
FIG. 2 schematically illustrates a receiver according to the invention.

A first embodiment of the receiver 104 will now be described with reference to FIG. 2.

The receiver 104 comprises a sampler 208 designed to sample the received signal r(t) and thus provide successive samples $y_{n,m}$ of this signal r(t).

In particular, for each symbol period $T_s$ corresponding to the transmission of a symbol $s_n$, the sampler 208 provides a set $y_n$ of M samples $y_{n,m}$ (M being greater than or equal to one) such that:

$$y_n = \begin{pmatrix} y_{n,M-1} \\ \dots \\ y_{n,0} \end{pmatrix} \qquad \text{[Math 1]}$$

where m is an integer index varying from 0 to M−1, M denoting the total number of samples per symbol received during the symbol period $T_S$.

Figure 3:
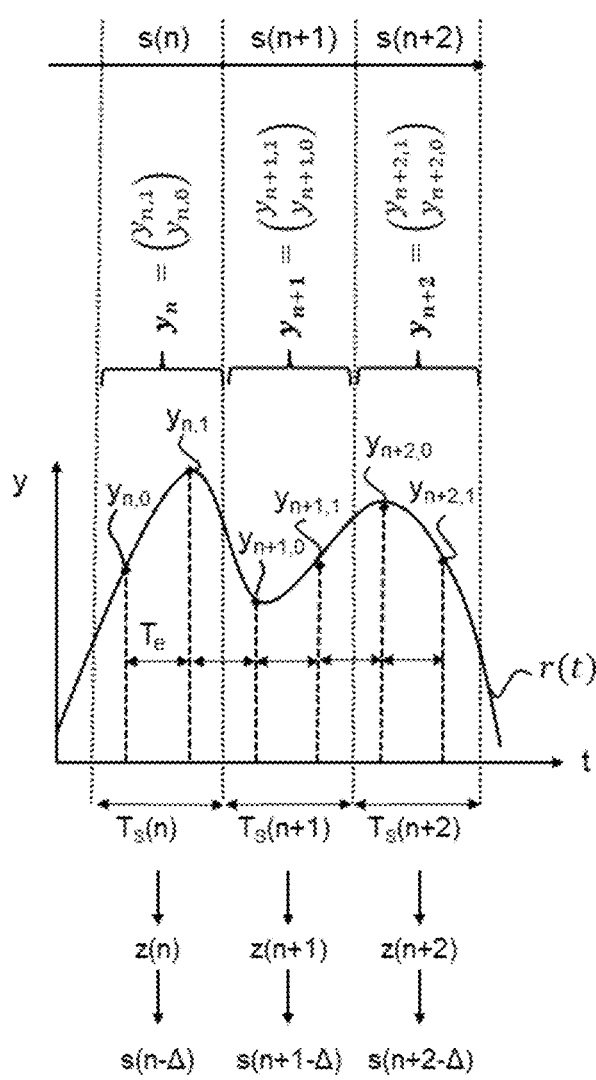
FIG. 3 schematically illustrates one example of sampling carried out by the receiver according to the invention.

FIG. 3 schematically illustrates one example of a received signal r(t) and the corresponding digitized signal $y_n$ as provided at output of the sampler 208.

In general, the sampler 208 is configured to take M samples per symbol with a sampling period $T_e$ between each sample, such that $T_e = T_S/M$.

In the example of FIG. 3, the sampler 208 is configured to take two samples (M=2) per symbol period $T_S$. The sampling period $T_e$ is equal to half the symbol period $T_S$, such that $T_e = T_S/2$. The sampler 208 thus provides the following three sample vectors for the three consecutive symbols $s_n$, $S_{n+1}$, $S_{n+2}$, respectively:

$$y_n = \begin{pmatrix} y_{n,1} \\ y_{n,0} \end{pmatrix}; y_{n+1} = \begin{pmatrix} y_{n+1,1} \\ y_{n+1,0} \end{pmatrix}; y_{n+2} = \begin{pmatrix} y_{n+2,1} \\ y_{n+2,0} \end{pmatrix} \qquad \text{[Math 2]}$$

Returning to FIG. 2, the receiver 104 furthermore comprises an equalizer 210 connected to the output of the sampler 208. The equalizer 210 is configured to provide, at each symbol period $T_S$, an estimate $z_n$ of the received symbol based on the M samples $y_{n,m}$ provided by the sampler 208.

The receiver 104 furthermore comprises a noise estimator 212 connected to the output of the sampler 208, on the one hand, and to the equalizer 210, on the other hand. Conventionally, the noise estimator 212 is configured to compute the variance $\sigma_w^2$ of the noise based on the samples $y_n$ provided by the sampler 208 and to provide this variance to the equalizer 210.

In the present example, the noise is a Gaussian additive noise that is centered (that is to say with zero expectation), with a variance $\sigma_w^2$ and independent of the transmitted symbols. More generally, the noise characteristics are specific to the communication system in question and depend notably on the nature of the transmission channel 106. These characteristics will thus be able to be adjusted depending on the transmission system under consideration.

The receiver 104 furthermore comprises a channel estimator 214 connected to the output of the sampler 208, on the one hand, and to the equalizer 210, on the other hand. The channel estimator 214 is configured firstly to compute, based on the samples $y_n$, a channel matrix H representative of the deformations that the propagation channel 106 imposes on the symbols, and secondly to provide this channel matrix H to the equalizer 210. This matrix describes the inter-symbol interference model specific to the propagation channel in question.

Preferably, the channel matrix H is a block Toeplitz matrix, comprising for example at least one non-zero block in the first position of the first row and the first column.

The equalizer 210 is configured to receive data relating to the modulation format used by the transmitter 102 to transmit the symbols. For example, these data include the expectation $\mathbb{E}[s_n]$ and/or the variance $$\sigma_s^2$$

of the transmitted symbols $s_n$.

Figure 4:
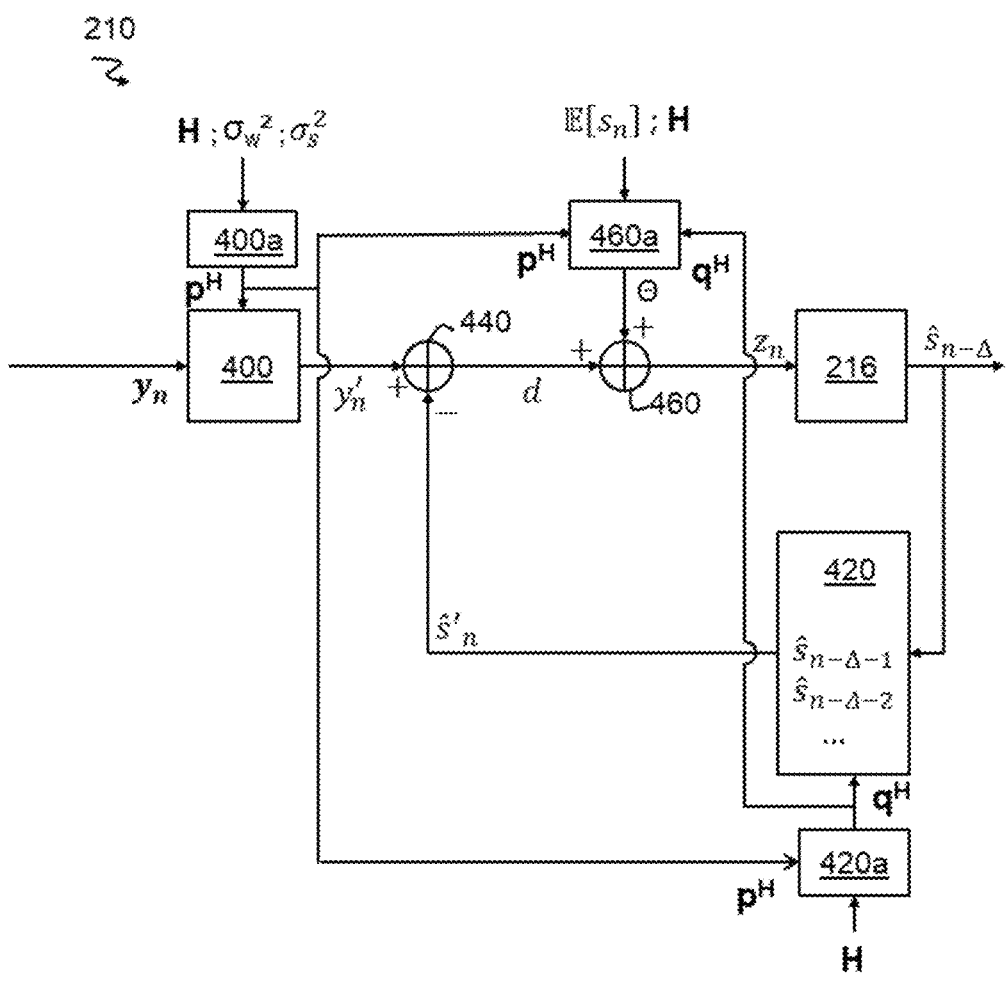
FIG. 4 schematically illustrates one exemplary implementation of an equalizer of the receiver according to a first embodiment.

The equalizer 210 will be described in more detail below with reference to FIG. 4.

The receiver 100 furthermore comprises a decision module 216 designed to select the symbol of the alphabet $\Omega$ closest to the estimate $z_n$. The selected symbol is thus taken as detected symbol $\hat{s}_{n-\alpha}$, where $\Delta$ is the restitution delay, which is a parameter of the equalizer 210.

For example, the decision module 216 is designed to compare the estimate $z_n$ with regions defined by predefined thresholds, each region being respectively associated with one of the symbols of the alphabet $\Omega$. The thresholds are independent of the equalizer 210 and in particular of its coefficients $p^H$ and of its scalar component $\Theta$, which will be described later.

The equalizer 210 of the receiver 104 from FIG. 2 will now be described in more detail with reference to FIG. 4.

The equalizer 210 comprises a sample combiner, referred to as feedforward combiner 400, designed, for each symbol period $T_S$, to receive the samples $y_n$ and to provide a linear combination $y'_n$ of said samples.

For example, the feedforward combiner 400 is defined by forward coefficients $p^H$, such that the linear combination $y'_n$ is obtained by weighting the samples $y_n$ with the forward coefficients $p^H$, such that $y'_n = p^H \times y_n$, where $\times$ is the scalar product.

For example, this feedforward combiner 400 is a feed-forward filter, preferably a finite impulse response (FIR) digital filter.

The equalizer 210 furthermore comprises a configuration module 400a for configuring the feedforward combiner 400, for configuring said combiner on the basis of configuration parameters.

For example, these configuration parameters include channel parameters specific to the propagation channel 106, such as the channel matrix H and/or the noise variance $\sigma_w^2$. These configuration parameters may also include parameters specific to the modulation alphabet $\Omega$, such as the variance $\sigma_s^2$ of the transmitted symbols $s_n$.

If the feedforward combiner 400 is an FIR filter, the configuration module 400a determines the coefficients $p^H$ defining the filter. For example, this vector $p^H$ comprises N×M coefficients, such that the feedforward combiner 400 provides a linear combination of samples every $T_S$ seconds.

The equalizer 210 furthermore comprises a feedback loop between the decision module 216 and the feedforward combiner 400, in order to improve symbol detection based on the previously detected symbols. This loop comprises a detected-symbol combiner, referred to as feedback combiner 420, at the output of the decision module 216, on the one hand, and a subtractor 440 between the feedforward combiner 400 and the feedback combiner 420, on the other hand.

The feedback combiner 420 is configured to provide, for each symbol period $T_S$, a linear combination of the symbols $\hat{s}_{n-\Delta-1}$, $\hat{s}_{n-\Delta-2}$, . . . previously detected by the decision module 216 $\Delta$ symbol periods earlier. This linear combination of symbols is denoted $\hat{s}'_n$.

For example, the feedback combiner 420 is a backward filter, preferably a finite impulse response (FIR) digital filter. As an alternative, the backward filter could be an infinite impulse response (IIR) filter.

The equalizer 210 furthermore comprises a configuration module 420a for configuring the feedback combiner 420, designed to configure said combiner on the basis of parameters specific to the propagation channel 106, such as the channel matrix H, and configuration parameters of the feedforward combiner 400, such as the coefficients $p^H$.

If the backward filter is an FIR filter, the configuration module 420a for configuring the symbol feedback combiner 420 determines a vector of coefficients $q^H$ defining the filter, this vector comprising $N_b$ coefficients, such that the backward filter 420 provides a linear combination of samples every $T_S$ seconds.

The subtractor 440 is configured to compute a difference d between the linear combination $y'_n$ of the samples $y_n$ and the linear combination of the previously detected symbols $\hat{s}'_n$, that is to say the difference $$d = y'_n - \hat{s}'_n.$$

The equalizer 210 furthermore comprises an addition module 460 between the subtractor 440 and the decision module 216. Advantageously, the addition module 460 is configured to add a non-zero scalar component $\Theta$ to the difference d, such that the estimate $z_n$ is given by $$z_n = y'_n - \hat{s}'_n + \Theta.$$

Adding this non-zero scalar component $\Theta$ makes it possible to compensate at least partially for the bias resulting from the impact of the expectation $\mathbb{E}[s_n]$ of the transmitted symbols $s_n$ through the combined action of the channel matrix H and the coefficients $p^H$.

The equalizer 210 furthermore comprises a configuration module 460a designed to compute the non-zero scalar component $\Theta$ and to provide this component to the addition module 460 so as to add it to the difference d.

For example, the configuration module 460a is configured to compute the non-zero scalar component $\Theta$ on the basis of parameters related to the alphabet $\Omega$, such as the expectation $\mathbb{E}[s_n]$ of the transmitted symbols $s_n$, of configuration parameters of the pre-combiner 300, such as the coefficients $p^H$, and/or of parameters specific to the propagation channel 106, such as the channel matrix H.

Thus, if the equalizer 210 implements an FIR pre-filter 300 defined by the coefficients $p^H$ and a backward FIR filter 320 defined by the coefficients $q^H$, the estimate $z_n$ provided at input of the decision module 216 is such that:

$$z_n = p^H \times y_n - q^H \times \hat{s}_n + \Theta \qquad \text{[Math 4]}$$

where $$\hat{s}_n = \begin{pmatrix} \hat{s}_{n-\Delta-1} \\ \cdots \\ \hat{s}_{n-\Delta-Nb} \end{pmatrix}$$

denotes the vector grouping together the $N_b$ past decisions relating to the symbols transmitted $\Delta+1$ symbol periods earlier.

The configuration modules 400a, 420a, 460a are designed to configure the feedforward combiner 400, the feedback combiner 420 and the scalar component addition module 460, respectively. These modules may be implemented in the form of software executed by one and the same information processing module, such as that described below with reference to FIG. 9.

Figure 5:
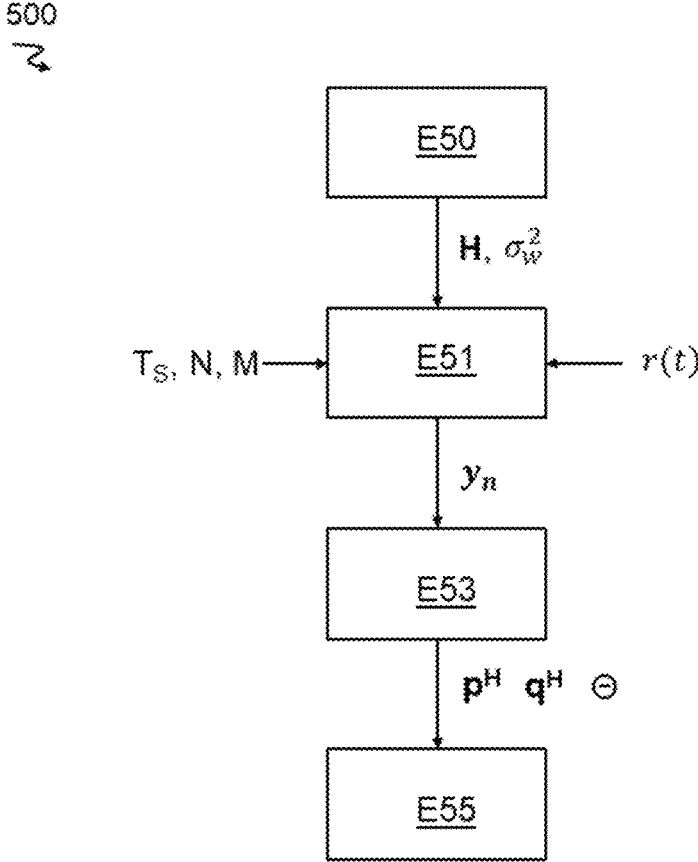
FIG. 5 schematically illustrates a method for configuring the equalizer from FIG. 4.

A method 500 for configuring the equalizer 210 will now be described with reference to FIG. 5, in the case where the pre-combiner 400 and the feedback combiner 420 are FIR filters as described with reference to FIG. 4.

In an initialization step E50, the receiver 104 receives a known reference message from the transmitter 102. The noise estimator 212 and the channel estimator 214 described above with reference to FIG. 2 determine, based on analysis of this known message, the noise variance $\sigma_w^2$ and the channel matrix H, respectively, and provide this information to the equalizer 210.

In a sampling step E51, the sampler 208 samples the received signal r(t) corresponding to an unknown message e(t) transmitted by the transmitter 102, so as to provide a set of blocks of M successive samples for N received symbols. A block of M samples is thus provided every $T_S$ seconds (symbol period) by the sampler 208.

By collecting the last N×M received samples (that is to say N blocks of M samples), up to the time $NT_S+(M-1)$ $T_S/M$, in the form of vectors, the samples may be written in the framework of the model presented as follows:

$$\begin{pmatrix} y_n \\ \vdots \\ y_{n-N+1} \end{pmatrix} = \qquad \text{[Math 5]}$$

$$\begin{pmatrix} h_0 & \cdots & h_{L-1} & 0 & & 0 \\ 0 & \ddots & & \ddots & & \vdots \\ \vdots & 0 & \ddots & & \ddots & 0 \\ 0 & \cdots & 0 & h_0 & \cdots & h_{L-1} \end{pmatrix} \begin{pmatrix} s_n \\ \vdots \\ s_{n-N-L+2} \end{pmatrix} + \begin{pmatrix} w_n \\ \vdots \\ w_{n-N+1} \end{pmatrix}$$

H denoting the channel matrix, preferably equal to a block Toeplitz matrix describing the inter-symbol interference model specific to the propagation channel, $s_n$ being the vector of the transmitted symbols contributing to the inter-symbol interference present in the last N×M received samples, and $w_n$ is a centered Gaussian noise vector with a variance $\sigma_w^2$ on each coordinate and independent of the transmitted signal.

For example, the channel matrix comprises two null blocks, more specifically a lower null triangular block and an upper null triangular block.

In a computing step E53, the configuration module 400a for configuring the feedforward combiner 400 computes the coefficients $p^H$, the configuration module 420a for configuring the feedback combiner 420 computes the coefficients $q^H$ and the configuration module 460a for configuring the addition module 460 computes the non-zero scalar component $\Theta$.

For example, the parameters $p^H$, $q^H$, $\Theta$ of the equalizer 210 are computed so as to minimize the mean squared error (MSE) cost function between the estimate $z_n$ and the symbol $s_{n-\Delta}$, where $\Delta$ denotes the delay in the restitution of the symbols by the receiver, denoted:

$$J(p^H, q^H, \Theta) = \mathbb{E}|z_n - s_{n-\Delta}|^2 \qquad \text{[Math 6]}$$

As an alternative, the parameters $p^H$, $q^H$, $\Theta$ of the equalizer 210 are computed so as to minimize a bit error rate (BER).

Advantageously, the delay $\Delta$ may be optimized. For example, it is possible to trial multiple values of the delay $\Delta$ (for example by scanning) to find the best one, that is to say the one that minimizes the cost function J.

The result of this computation to minimize the function J makes it possible to determine the parameters $p^H$, $q^H$, $\Theta$ of the equalizer 210 using the following expressions:

$$p^H = \sigma_s^2 h_{\Delta+1}^H (\sigma_s^2 H(I - J_\Delta J_\Delta^H)H^H + \sigma_w^2 I)^{-1} \qquad \text{[Math. 7]}$$

$$q^H = p^H H J_\Delta$$

$$\Theta = \mathbb{E}(s_{n-\Delta})\left(1 - p^H \sum_H + \sum_i q_i^*\right)$$

where $\Sigma_H = \Sigma_i H(:, i)$ denotes the sum of the values of the columns of the channel matrix H; $h_{\Delta+1} = H(:, \Delta+1)$ denotes the column $\Delta+1$ of the channel matrix H; $\mathbb{E}(s_n)$ denotes the expectation of the transmitted symbols; $\sigma_s^2$ denotes the variance of the transmitted symbols; $q_i^*$ denotes the coefficient of rank i in $q^H$; I denotes the identity matrix;

$$J_\Delta = \begin{pmatrix} 0_{(\Delta+1) \times N_b} \\ I_{N_b} \\ 0_{s \times N_b} \end{pmatrix}$$

with $s = N+L-2-\Delta-N_b$; and 0 denotes the null matrix.

The value of the non-zero scalar component $\Theta$ is thus defined notably on the basis of the mathematical expectation of the non-centered alphabet $\Omega$ and of the channel matrix H modeling in particular inter-symbol interference.

This result is obtained making the following assumptions: the value of the transmitted symbols $s_n$ is a stationary random variable, meaning that the mathematical expectation of the symbols is time-invariant, that is to say $\mathbb{E}(s_n) = \mathbb{E}(s_{n-\Delta})$; the noise is decorrelated from the transmitted symbols $s_n$, meaning that the covariance of the noise and the symbols is zero; and the noise has a zero mathematical expectation, that is to say $\mathbb{E}(w_n) = 0$.

The expressions computed above are obtained assuming a zero-mean Gaussian white noise. However, they could of course be adapted by those skilled in the art so as to take into account other noise statistics, for example a correlated noise, while still remaining within the scope of the present invention.

The equations [Math 7] are for example determined beforehand and implemented respectively in the configuration modules 400a, 420a, 460a.

In a configuration step E55, the parameters $p^H$, $q^H$, $\Theta$ are applied to the pre-filter 300, to the backward filter 320 and to the addition module 360, respectively, so as to configure the equalizer 210.

Once the equalizer 210 has been configured, the configuration parameters remain unchanged for the reception of multiple symbols.

Figure 6:
FIG. 6 schematically illustrates one exemplary implementation of the equalizer of a receiver according to a second embodiment.
Figure 6:
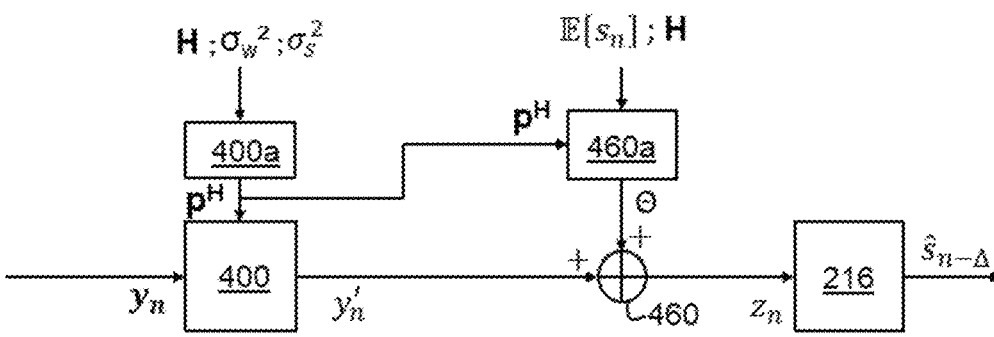

A second embodiment of the receiver according to the invention will now be described with reference to FIG. 6.

According to the second embodiment, the equalizer, which now bears the reference 610, differs from the equalizer 210 according to the first embodiment in that it does not comprise a feedback loop.

The feedforward combiner 400 thus provides the linear combination $y'_n$ based on the samples $y_n$ and the addition module 460 adds the non-zero scalar component $\Theta$ to this linear combination $y'_n$ so as to obtain the estimate $z_n$, such that $z_n = y'_n + \Theta$. The estimate $z_n$ is thereby computed independently of the previously detected symbols $\hat{s}_{n-\Delta-1}$, $\hat{s}_{n-\Delta-2}$, etc.

As described above, the feedforward combiner 400 may be an FIR filter configured by the configuration module 400a and designed to compute the coefficients $p^H$. The estimate $z_n$ is thus determined on the basis of these coefficients, such that $z_n = p^H \times y_n + \Theta$.

The method described with reference to FIG. 5 remains valid, with the difference that only the coefficients $p^H$ and the non-zero scalar component $\Theta$ are computed in step E53.

The parameters $p^H$ and $\Theta$ of the equalizer 610 are computed making the same assumptions as those made previously for the first embodiment. In this case, the parameters of the equalizer 610 are determined according to the following expressions, with the same notations as previously:

$$p^H = \sigma_s^2 h_{\Delta+1}^H (\sigma_s^2 HH^H + \sigma_w^2 I)^{-1} \qquad \text{[Math. 8]}$$

$$\Theta = \mathbb{E}(s_{n-\Delta})\Big(1 - p^H \sum\nolimits_H\Big)$$

It may be seen that the non-zero scalar component $\Theta$ depends solely on the predefined expectation of the alphabet $\Omega$, the channel matrix H and the coefficients $p^H$.

Assuming that the value of the symbols $s_n$ is a stationary random variable, then the associated expectation is time-invariant, meaning that $\mathbb{E}(s_{n-\Delta}) = \mathbb{E}(s_n)$. Assuming that the propagation channel 106 is stationary over a reference period, the channel matrix H is time-invariant. In this case, the non-zero scalar component $\Theta$ is a constant over this reference period.

In the two embodiments described above, the parameters of the equalizer 210 are initially computed analytically, notably on the basis of external parameters related to the propagation channel 106, to noise and to the statistical properties of the symbols $s_n$. In particular, the channel estimator 214 and the noise estimator 212 may be used to provide the equalizer 210 with the channel matrix H and the noise variance $\sigma_w^2$.

As an alternative, the parameters $(\Theta, p^H, q^H)$ or $(\Theta, p^H)$ of the equalizer 210 may be determined adaptively using a convergence and tracking technique. This technique constitutes one variant implementation that may be applied to each of the embodiments described above.

Figure 7:
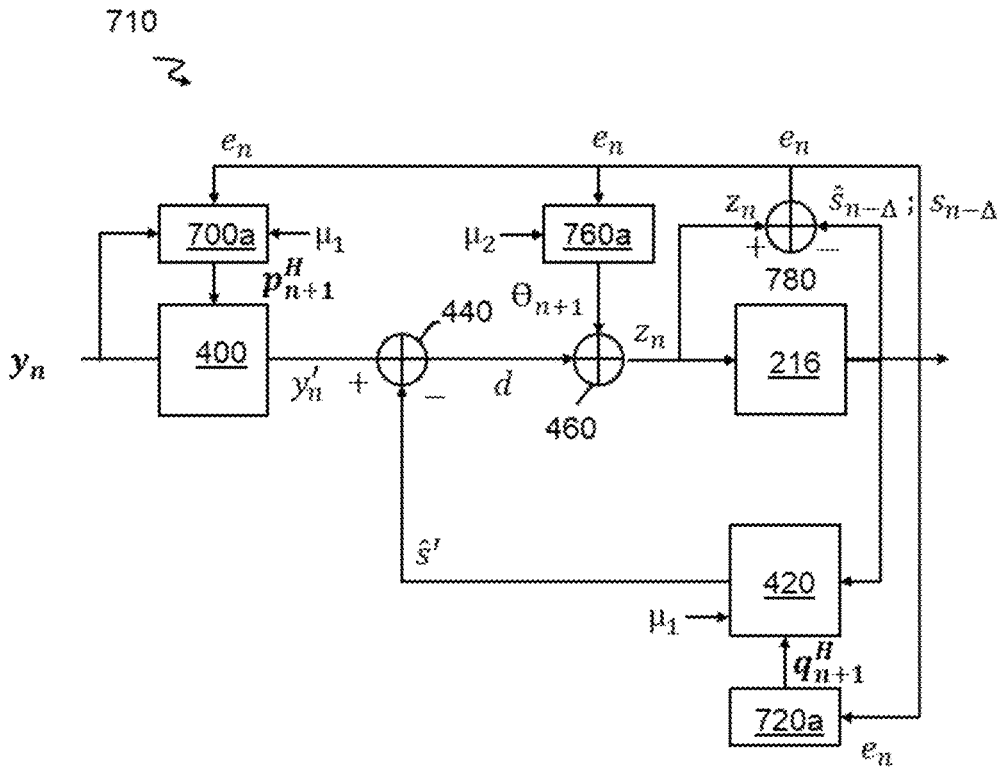
FIG. 7 schematically illustrates a method for configuring the equalizer according to one variant implementation of the first embodiment.

One variant of the first embodiment of the equalizer will now be described with reference to FIG. 7 for determining and adjusting the parameters of the equalizer using a convergence and tracking technique.

According to this variant, the equalizer, which now bears the reference 710, is designed to iteratively update the scalar component $\Theta$ on the basis of symbols previously determined by the decision module 216. This does not require the use of a decoder (or soft demapper) that uses multiple successive estimates to analyze them, as with error correction. On the contrary, the decision module 216 provides each symbol $\hat{s}_{n-\Delta}$ based on a single estimate $z_n$.

The equalizer 710 thus furthermore comprises a comparison module 780 for comparing the symbols previously detected by the decision module 216 with the estimate $z_n$, so as to compute an error signal $e_n$. For example, the error signal $e_n$ provided at output of the comparison module 780 is such that $e_n = z_n - s_{n-\Delta}$.

The comparison module 780 has an output connected to the configuration module 700a for configuring the feedforward combiner 400, to the configuration module 720a for configuring the feedback combiner 420 and to the configuration module 760a for configuring the addition module 460, such that the error signal $e_n$ is provided, for each symbol period, simultaneously at input of these configuration modules 700a, 720a, 760a.

A method 800 for configuring the equalizer 710 will now be described in more detail with reference to FIG. 7.

In an initialization step E80, the parameters $p^H$, $q^H$, $\Theta$ of the equalizer 710 are initialized, for example with the following default values: $p^H = (1, 0, 0, \ldots, 0)$; $q^H = (0, 0, 0, \ldots, 0)$; $\Theta = 0$.

In a transmission/reception step E82, the transmitter 102 starts sending a known sequence of symbols, and the receiver 104 receives this sequence.

This known sequence of symbols is used by the equalizer 710 to update its configuration parameters $p^H$, $q^H$, $\Theta$ as it receives the symbols of the known sequence. This update is carried out iteratively, in a convergence phase B1 as described below.

Upon each new set of M samples $y_n$ provided by the sampler 208, the configuration parameters $p^H$, $q^H$, $\Theta$ of the equalizer 710 are updated. The parameters of the equalizer 710 are thus updated once per symbol period, for each symbol of the known sequence received in the convergence phase B1.

This update is carried out by comparing the estimates $z_n$ of the symbols with the symbols of the known sequence.

Each symbol $s_n$ of the known sequence is received by the receiver with a delay $\Delta$. Thus, in a comparison step E84, the comparison module 780 provides, for each symbol period, the error signal e(n) between the estimate $z_n$ and the received symbol $s_{n-\Delta}$ such that $e_n = z_n - s_{n-\Delta}$. This error signal e(n) is transmitted, at each symbol period, to the configuration modules 700a, 720a, 760a.

In an update step E86, the configuration modules 700a, 720a, 760a compute the configuration parameters $p^H$, $q^H$, $\Theta$ of the equalizer 710 on the basis of the initial value set in the initialization step E80 or of an earlier value of the parameters determined in the previous period (that is to say in a previous iteration).

For example, in the update step E86, the configuration module 700a for configuring the pre-filter 400 is configured to compute the coefficients $p^H$ of said filter using the following recurrence relation:

$$p_{n+1}^H = p_n^H - \mu_1 e_n y_n^H \qquad \text{[Math 9]}$$

the configuration module 720a for configuring the backward filter 420 is configured to compute the coefficients $q^H$ of said filter using the following recurrence relation:

$$q_{n+1}^H = q_n^H + \mu_1 e_n \hat{s}_n^H \qquad \text{[Math 10]}$$

the configuration module 760a for configuring the addition module 460 is configured to compute the scalar component $\Theta$ using the following recurrence relation:

$$\Theta_{n+1} = \Theta_n - \mu_2 e_n \qquad \text{[Math 11]}$$

where $e_n = z_n - s_{n-\Delta}$ denotes the difference (or error) between the estimate $z_n$ and the symbol $s_{n-\Delta}$ transmitted with a delay $\Delta$ for the symbol period $T_n$; $\mu_1$ denotes an adaptation step, preferably less than 1, for adapting the coefficients $p^H$ of the pre-filter and the coefficients $q^H$ of the backward filter and $\mu_2$ denotes an adaptation step, preferably less than 1, for adapting the scalar component $\Theta$. For example, the adaptation steps p, and $\mu_2$ are equal, such that $\mu_1 = \mu_2$.

This update is carried out iteratively, that is to say period by period, so as to converge toward a target value. Thus, after each update, the equalizer 710 determines, in a test step E88, whether a convergence criterion has been reached. For example, a convergence criterion is such that the difference $e_n$ is less than a predetermined convergence threshold $e_1$.

Once the error $e_n$ is less than the predetermined convergence threshold $e_1$ (that is to say $e(n)<e_1$), a tracking phase B2 is implemented, which will be described in more detail below.

In this tracking phase B2, the updating of the parameters of the equalizer 710 is governed by the previous symbol detections. Thus, the tracking step B2 differs from the convergence step B1 in that it uses the symbols $\hat{s}_{n-\Delta}$ detected in the error $e_n$ rather than the transmitted symbols $s_{n-\Delta}$ to update the parameters of the equalizer 710.

Thus, in a step E89, the error signal e(n) is replaced by an error signal between the estimate $z_n$ and the symbol $\hat{s}_{n-\Delta}$ detected with a delay $\Delta$, such that $e_n = z_n - \hat{s}_{n-\Delta}$.

The parameters of the equalizer 710 are determined in each iteration in the update step E86, using the same equations Math 9, Math 10 and Math 11 as described above, as long as the error $e_n = z_n - \hat{s}_{n-\Delta}$ is greater than the predetermined convergence threshold $e_1$.

Once this error e(n) becomes greater than the predetermined convergence threshold $e_1$, the method changes to the convergence phase B1 by executing steps E84, E86 as long as $e_n > e_1$, as described above.

Figure 9:
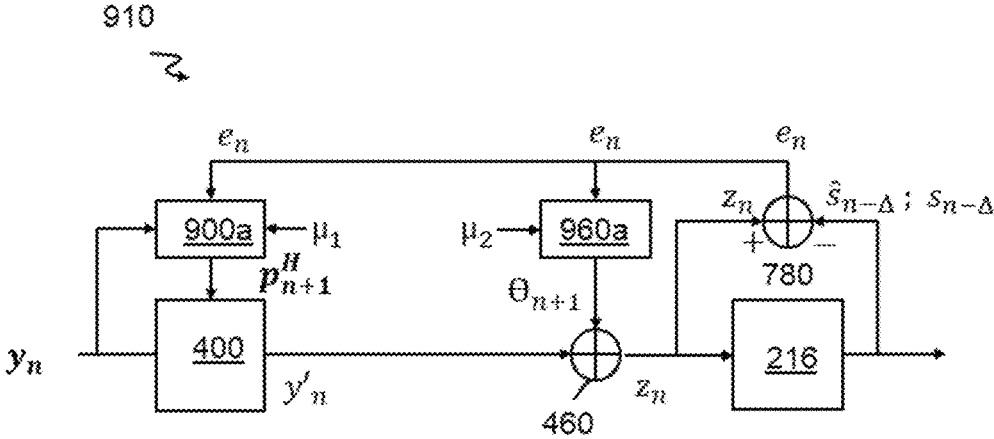
FIG. 9 schematically illustrates one exemplary implementation of the equalizer according to one variant implementation of the second embodiment.

One variant of the second embodiment of the equalizer will now be described with reference to FIG. 9 for determining and adjusting the parameters of the equalizer using the previously described convergence and tracking technique.

According to this variant, the equalizer, which now bears the reference 910, is designed to iteratively determine its configuration parameters $\Theta$, $p^H$.

Figure 8:
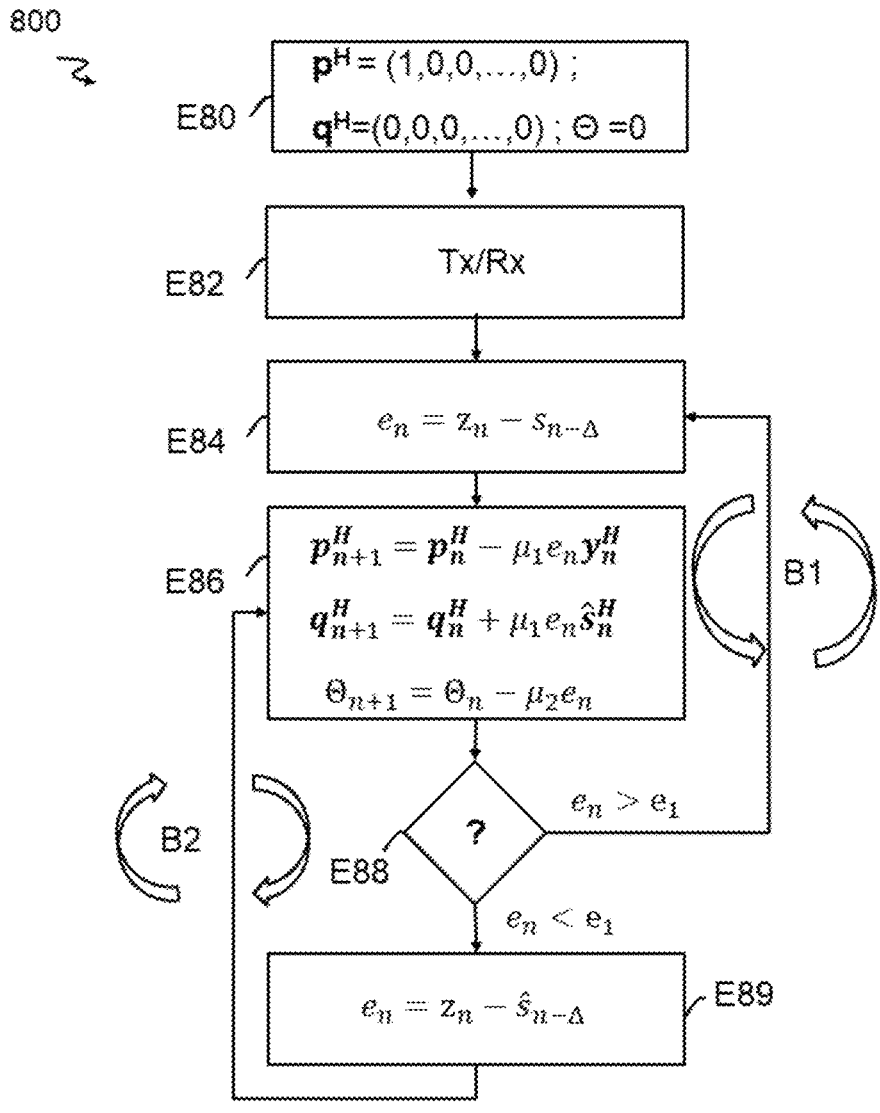
FIG. 8 schematically illustrates a method for configuring the equalizer according to one variant implementation of the second embodiment.

As described with reference to FIG. 7, the equalizer 910 comprises the comparison module 780 for comparing the symbols previously detected by the decision module 216 with the estimate $z_n$, so as to compute the error signal $e_n$. As described above, the configuration parameters $\Theta$, $p^H$ of the equalizer 910 are updated in each iteration on the basis of the error signal e(n), respectively by the configuration modules 900*a* and 960*a*, using the same method 800 as described with reference to FIG. 8, with the difference that only the parameters $\Theta$, $p^H$.

For example, in the update step E86, the configuration module 900*a* for configuring the pre-filter 400 is configured to compute the coefficients $p^H$ of said filter using the recurrence relation [Math 9];

the configuration module 960*a* for configuring the addition module 460 is configured to compute the scalar component $\Theta$ using the recurrence relation [Math 11].

Figure 10:
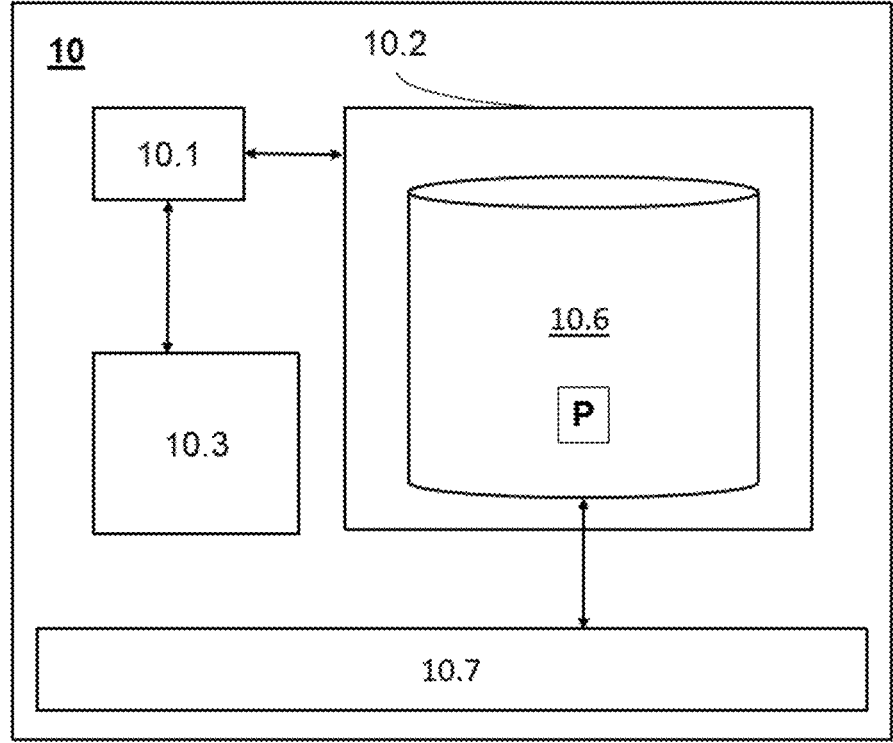
FIG. 10 schematically illustrates an information processing device intended to implement the invention.

In the examples described above, the receiver 106 according to the invention may comprise a computer system 10, as illustrated in the form of a block diagram in FIG. 10, designed to implement one or more modules described above.

This computer system 10 comprises a data processing unit 10.1 (such as a microprocessor, denoted CPU for central processing unit), a main memory 10.2 (such as a random access memory, denoted RAM) accessible to the processing unit 10.1, a read-only memory 10.3, denoted ROM, accessible to the processing unit 10.1, an optional computer-readable storage medium, such as for example a local medium (such as a local hard drive 10.6, denoted HD) or else a removable medium (such as a USB (universal serial bus) key, or a CD (compact disc) or a DVD (digital versatile disc) able to be read by an appropriate reader of the computer system 10 (such as a USB port or a CD and/or DVD disc reader); an input/output module 10.7 for receiving/sending data from/to external peripherals such as a hard disk, removable storage medium or the like.

A computer program P containing instructions in the form of an executable code for the processing unit 10.1 is recorded on the medium 10.6.

This computer program P is for example intended to be loaded into the main memory in order for the processing unit 10.1 to execute its instructions. These instructions implement one or more of the modules described above, which are thus software modules.

As an alternative, all or some of these modules could be implemented in the form of hardware modules, that is to say in the form of an electronic circuit, for example a micro-wired circuit, not involving a computer program.

It is clear that a receiver such as that described above makes it possible, by adding a non-zero scalar component to the estimate $z_n$ before detection of the symbol, to improve symbol detection performance.

It should also be noted that the invention is not limited to the embodiments described above. Indeed, it will be apparent to those skilled in the art that various modifications may be made to the embodiments described above, in the light of the teaching that has just been disclosed to them.

The above embodiments and variants have been described to improve the detection performance of a digital data receiver in the presence of inter-symbol interference, this being the most frequent use case. More generally, the invention may also be applied to any other type of distortion or interference caused by the propagation channel, since these are able to be modeled in the form of a compatible Toeplitz matrix, such that the sampled signal $y_n$ is able to be written in the matrix form $y_n = H \cdot s_n + w_n$ according to the expression [Math 5].

In the examples described above, finite impulse response filters have been described for implementing the sample combiner (that is to say feedforward filter) and the previously detected symbol combiner (that is to say backward filter). Other types of filters may also be used.

In the detailed presentation of the invention given above, the terms that are used should not be interpreted as limiting the invention to the embodiments disclosed in the present description, but should be interpreted so as to include therein all equivalents that those skilled in the art have the ability to foresee by applying their general knowledge to the implementation of the teaching that has just been disclosed to them.

The invention claimed is:

1. A digital data receiver comprising:

a sampler configured to sample a received signal (r(t)) that has propagated in a propagation channel, N symbols being encoded in the received signal (r(t)), N being an integer, in order to provide a set of blocks of samples for the N symbols, the N symbols being selected from a predefined alphabet ($\Omega$) having K symbols, K being an integer, the sampler providing N blocks of M samples, M being at least equal to 1;

an equalizer configured to compute, for each symbol ($s_n$) among the N symbols, an estimate ($z_n$) of said symbol ($s_n$) based on the samples provided by the sampler, the equalizer comprising a sample combiner configured to receive said samples provided by the sampler, and to provide a linear combination of said samples, said estimate ($z_n$) of said symbol ($s_n$) being determined from said linear combination; and a decision module configured to determine detected symbols, a detected symbol being determined for each estimate ($z_n$) computed for a symbol ($s_n$), a detected symbol ($\hat{s}_n$) being a symbol selected from said K symbols in the predefined alphabet ($\Omega$) that is the closest to the estimate ($z_n$) computed for each symbol ($s_n$);

wherein the predefined alphabet ($\Omega$) exhibits a decentering such that each of said N symbols have a non-zero predefined expectation ($\mathbb{E}[s_n]$), and the equalizer is configured to add a non-zero scalar component ($\theta$) to said linear combination in order to compensate at least partially for the decentering;

the equalizer being configured to iteratively update the non-zero scalar component ($\theta$) from the detected symbols previously determined by the decision module.

2. The digital data receiver as claimed in claim 1, wherein the equalizer is configured to compute the non-zero scalar component ($\theta$) from coefficients of the linear combination of samples and the predefined expectation ($\mathbb{E}[s_n]$).

3. The digital data receiver as claimed in claim 1, wherein the equalizer is configured to compute the non-zero scalar component ($\theta$) based on a channel matrix (H) representative of the propagation channel.

4. The digital data receiver as claimed in claim 3, wherein said channel matrix (H) is a block Toeplitz matrix.

5. The digital data receiver as claimed in claim 1, wherein the equalizer is configured to compute said non-zero scalar component ($\theta$) so as to minimize a mean squared error between the symbols ($s_n$) and the estimates ($z_n$).

6. The digital data receiver as claimed in claim 1, wherein the equalizer comprises a feedforward filter and the equalizer is designed to apply the feedforward filter to the samples in order to provide said linear combination.

7. The digital data receiver as claimed in claim 6, wherein the equalizer is configured to compute the non-zero-scalar component ($\theta$) based on the feedforward filter.

8. The digital data receiver as claimed in claim 1, wherein the equalizer is configured to compute, for each symbol ($s_n$), the estimate ($z_n$) of said symbol ($s_n$) independently of previously detected symbols.

9. The digital data receiver as claimed in claim 1, wherein the equalizer is configured to compute, for each symbol ($s_n$), the estimate ($z_n$) of said symbol ($s_n$) based on a difference (d) between the linear combination of the samples for said symbol ($s_n$) and an other linear combination of previously detected symbols ($\hat{s}_{n-1}, \ldots, \hat{s}_{n-\Delta}$), the non-zero scalar component ($\theta$) being added to said difference (d).

10. The digital data receiver as claimed in claim 9, wherein the equalizer further comprises a backward filter, and the equalizer is configured to apply said backward filter to the previously detected symbols ($\hat{s}_{n-1}, \ldots, \hat{s}_{n-\Delta}$) so as to provide said other linear combination of previously detected symbols ($\hat{s}_{n-1}, \ldots, \hat{s}_{n-\Delta}$).

11. The digital data receiver as claimed in claim 10, wherein the equalizer is configured to compute the non-zero scalar component ($\theta$) based on the backward filter.

12. The digital data receiver as claimed in claim 1, wherein the equalizer is configured to compute the non-zero scalar component ($\theta$) using the following recurrence relation:

$$\Theta_{n+1} = \Theta_n - \mu_2 e_n$$

where $e_n$ denotes the error signal defined as the difference between the estimate $z_n$ and a symbol $s_{n-\Delta}$ transmitted with a delay $\Delta$ for a symbol period $T_n$; and $\mu_2$ denotes an adaptation step, for the adaptation of the non-zero scalar component $\theta$.

13. A digital communication system, comprising a transmitter configured to transmit symbols selected from the predefined alphabet ($\Omega$) with the non-zero expectation ($\mathbb{E}[s_n]$), and the digital data receiver as claimed in claim 1.

14. A method for receiving digital data, comprising:

a step of sampling, by a sampler, a received signal (r(t)) that has propagated in a propagation channel, N symbols being encoded in this received signal (r(t)) N being an integer, in order to provide a set of blocks of samples for the N symbols, the N symbols being selected from a predefined alphabet ($\Omega$) having K symbols, K being an integer, the sampling step providing N blocks of M samples, M being at least equal to 1;

a step of performing a linear equalization, by an equalizer, comprising computing, for each symbol ($s_n$), an estimate ($z_n$) of said symbol ($s_n$) from the samples provided by the sampling step, the linear equalization step comprising performing a linear combination of the samples provided by the sampling step, said estimate ($z_n$) of said symbol being determined from the linear combination; and a step of determining detected symbols, a detected symbol ($\hat{s}_n$) being determined for each estimate ($z_n$) computed for a symbol ($s_n$), a detected symbol ($\hat{s}_n$) being a symbol selected from said K symbols in the predefined alphabet ($\Omega$) that is the closest to the estimate ($z_n$);

wherein the predefined alphabet ($\Omega$) exhibits a decentering such that each of the N symbols ($s_n$) have a non-zero predefined expectation ($\mathbb{E}[s_n]$), and the linear equalization comprises adding a non-zero scalar component ($\theta$) to the linear combination in order to compensate at least partially for the decentering, the non-zero scalar component ($\theta$) being iteratively updated from the previously determined detected symbols.

15. A non-transitory computer readable storage medium having stored thereon instructions that, when executed by a computer, implement the method as claimed in claim 14.

* * * * *